Jan. 26, 1932.  N. E. LINDENBLAD  1,842,553

GENERATOR

Filed April 25, 1929

INVENTOR
NILS E. LINDENBLAD
BY
ATTORNEY

Patented Jan. 26, 1932

1,842,553

UNITED STATES PATENT OFFICE

NILS E. LINDENBLAD, OF PORT JEFFERSON, NEW YORK, ASSIGNOR TO RADIO CORPORATION OF AMERICA, A CORPORATION OF DELAWARE

GENERATOR

Application filed April 25, 1929. Serial No. 357,893.

This invention relates to a generator and more particularly to a high power generator for generating high frequency alternating currents.

Broadly, one object of this invention is to provide a new method and means for generating alternating currents.

If between two field poles, a magnetic field is set up and then, if a conducting loop, or a plurality of such loops arranged about a common axis, is rotated within the field so set up, another field traversing and substantially at right angles to the first mentioned field will be found to exist. If the field in which the loops are rotated is constant in direction it will be found that the second field set up by the loops cutting the first field will also be constant in direction. If the first field, or as I may term it hereinafter, the exciting field, is made to alternate in direction slowly, the traversing field, or as I may term it, the inducing field, will also vary in direction slowly; and, if pick-up coils are placed in the path of the second field, useful alternating currents will be induced in the pick-up coils.

However, if the frequency of the exciting field is increased, it will be found that the inducing field becomes less and less until, when the exciting field frequency becomes fairly high, the inducing field becomes negligible for the production of alternating currents.

The reduction of the inducing field is due to certain currents set up in the loops by the high frequency variation of the exciting field and accordingly, another object of this invention is to reduce those currents whereby the inducing field may be maintained at a useful value regardless of the frequency of the exciting field. The manner in which this object is carried out is briefly, and thereby carried out, to oppose those currents destructive of the inducing field; and the apparatus for accomplishing this object is to provide additional reactances in the loops setting up the inducing field for impeding the aforesaid destructive currents.

Still another object of this invention is to utilize the added reactances in the loops for increasing the current generated and this is done by tuning the output circuit of the generator, thereby neutralizing the additional inductance of the loops to reactively increase the output currents of the generator.

Figure 1:
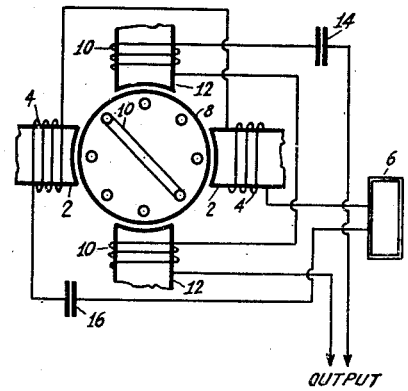
Figure 2:
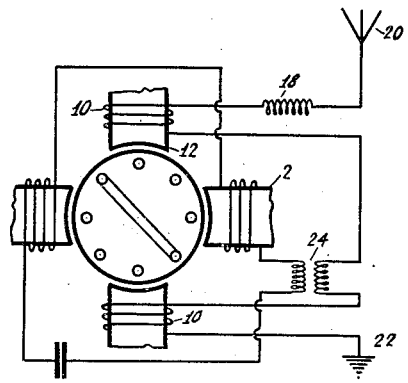
Figure 3:
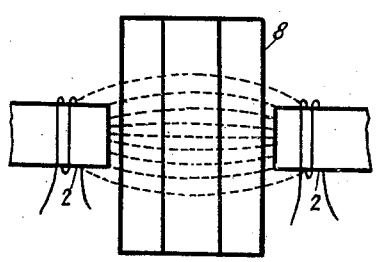
Figure 4:
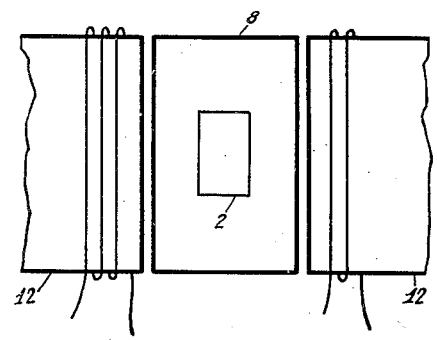

The invention may more readily be understood by referring to the accompanying drawings in which Figure 1 exemplifies diagrammatically an alternator embodying the principles already outlined, the alternator having a separate current source for energizing its excitation field coils, Figure 2 illustrates, by way of example, a manner in which an alternator, built according to this invention, is made self exciting, Figure 3 is a diagrammatic plan view of a rotor and excitation coils therefor utilized in a generator built according to this invention, and Figure 4 shows diagrammatically, and in plan view, the rotor, the pick-up coils and an exciting coil of a generator built in accordance with this invention.

Referring to Figure 1 in particular, numerals 2, 2 indicate exciting field poles having windings 4, 4 thereon. A source of alternating current 6 energizes windings 4, 4 thereby producing an alternating magnetic field between poles 2, 2. This field is the exciting field of the generator. The rotor 8 of the alternator comprises a drum having supported thereon in any suitable manner, a plurality of closed loops 10.

Assume that instead of producing an alternating field between the poles 2, 2 that a constant field, that is constant in direction, is produced in poles 2, 2 by energizing windings 4, 4 with a direct current. It will be seen that rotation of the loops 10 will cause currents to be set up therein which in turn will set up another magnetic field traversing the exciting field between poles 2, 2 and substantially at right angles thereto. Now, if low frequency alternating currents are applied to windings 4, 4 it will be equally clear that a low frequency alternating magnetic field will be set up traversing the field between poles 2, 2.

However, as the frequency of the excitation currents flowing through coils 4, 4 is increased, it will be found that those loops 10 which at any given instant have projected areas upon the pole faces of poles 2, 2, will have set up therein currents, not due to the rotation of rotor 10, but due to the variation in the magnetic field between 2, 2 in turn caused by the high frequency currents applied to windings 4, 4. The currents so induced in the loops 10 will set up an opposing field, that is, directly opposite in direction to the excitation field; and, as the frequency of the exciting currents is still further increased, the excitation field will become less and less due to the opposing field and accordingly, the inducing field or the field produced by the rotation of the conductors 10 will become less and less and eventually it will diminish to zero.

According to this invention, as already indicated, the currents induced in the loops solely by the variation of the magnetic field, are reactively opposed so that they will not be of sufficient value to produce an opposing field of any harmful value.

The simplest and most efficient way of doing this is by increasing the reactance or inductance of the loops 10 to the opposing currents by making the loops longer and by making them extend far beyond the exciting field. In this way the impedance to the opposing currents is materially increased thereby reducing them to any desired minimum value.

The manner of increasing the impedance is most clearly shown in Figure 3 where the rotor 8 is substantially wider than the exciting poles 2, 2. In this way the loops on the rotor 8 extend far beyond the exciting field and offer high reactance to currents tending to set up the opposing field. The exciting field is thus maintained and hence, the alternating traversing field which induces in the pick-up windings 10 on poles 12, alternating currents of high value, is preserved.

Another feature of the invention, also indicated briefly hereinbefore, resides in the utilization of the increased inductance of the loops for reactively increasing the output of the generator and this is done by inserting a condenser 14 in the output circuit of the generator. By making condenser 14 sufficiently large to tune the inductance of the pick-up coils 10 taken together with the mutual inductance between the loops and the pick-up coils 10, the currents in the output circuit will be materially assisted. The output of the generator will also be assisted by making the pick-up members or poles 12 as wide or wider than the rotor so that the total inducing field set up by the rotation of a rotor will interlink with the pick-up coils 10.

While the relative size of the pick-up coils, the excitation coil and the rotor is given in Figure 4, it is to be understood that this is by way of example and for the purpose of illustration only and that they may be varied within any desirable limits.

As a further refinement a condenser 16 may be placed in circuit with the exciting coils so as to tune the exciting field.

Turning to Figure 2, it will be seen that a self excited generator has been illustrated. The pick-up coils 10 are connected through a tuning coil 18 to any suitable antenna 20 and to ground at 22. In this case the capacity of the antenna replaces the capacity 14 of Figure 1 and the feed back coils 24 replace the source of alternating currents 6 of Figure 1.

A generator built according to this invention will be found to generate, highly satisfactorily, alternating currents up to 300,000 cycles per second. This upper limit is due to the grade of iron now available for use in the field units. With the introduction of better grade of iron the frequency at which the alternator may be operated satisfactorily will be correspondingly increased. The generator, of course, is not limited to use for radio signalling, but may also be used to good advantage in other fields such as in the metallurgical field for the smelting of metals. In that field it will probably be found advisable to run the alternator at or around 3,000 cycles per second.

The invention, is not to be limited solely to that which has been described and illustrated for it is apparent that many minor changes may be made by one skilled in the art without departing from the spirit and scope of this invention. Accordingly, it is to be understood that the invention is to be limited solely by the scope of the appended claims.

What is claimed is:

1. The method of generating currents which includes setting up a magnetic field, producing another field traversing said first mentioned field by cutting lines of force of said first mentioned field, reducing currents tending to set up an opposing field to said first mentioned field, and utilizing said second mentioned field to generate currents.

2. The method of generating alternating currents which includes setting up an alternating magnetic field, producing another field substantially at right angles to said first mentioned field by cutting lines of force of said first mentioned field, reducing currents, set up during the cutting of the first field, tending to set up a field opposing said first mentioned field and utilizing said second mentioned field to generate alternating currents.

3. The method of generating alternating currents which includes setting up an alternating magnetic field, producing another field substantially at right angles to said first mentioned field by cutting lines of force of said first mentioned field, reactively reducing currents tending to set up a field opposing said first mentioned field and utilizing said second mentioned field to generate alternating currents.

4. In combination, a pair of field poles, windings on each pole, a second set of poles disposed substantially at right angles to said first mentioned pair of poles, said second mentioned pair of poles being substantially wider than said first pair of field poles and windings on said second pair of poles whereby electrical energy may be obtained from a field, substantially at right angles to the field between said first mentioned pair of poles, by cutting lines of force of said first mentioned field.

5. Apparatus for generating currents which comprises means for setting up a magnetic field, means for producing another field traversing said first mentioned field by cutting lines of force of said first mentioned field, means for reducing currents, tending to set up an opposing field to said first mentioned field, and means for utilizing said second mentioned field to generate currents.

6. Apparatus for generating alternating currents which comprises means for setting up an alternating magnetic field, means for producing another field substantially at right angles to said first mentioned field, means for reducing currents tending to set up a field opposing said first mentioned field and means for utilizing said second mentioned field to generate alternating currents.

7. Apparatus for generating alternating currents which comprises means for setting up an alternating magnetic field, means for producing another field substantially at right angles to said first mentioned field by cutting lines of force of said first mentioned field, means for reactively reducing currents tending to set up a field opposing said first mentioned field and means for utilizing said second mentioned field to generate alternating currents.

8. In combination, a pair of field poles, windings on each pole a source of alternating current for energizing said windings thereby setting up an alternating field between said poles, a second set of poles disposed substantially at right angles to said first mentioned pair of poles, said second mentioned pair of poles being substantially wider axially than said first pair of field poles and windings on said second pair of poles whereby electrical energy may be obtained from a field, substantially at right angles to the field between said first mentioned pair of poles set up by cutting lines of force of said first mentioned field.

9. In combination, means for setting up an alternating magnetic field, a rotor having conductors thereon for cutting said field thereby producing a field substantially at right angles to said alternating magnetic field, and means, comprising loops, for reactively reducing currents in the conductors on said rotor tending to set up a field opposing said first mentioned field.

10. In combination, a pair of field poles, windings on each pole whereby an alternating magnetic field may be set up between said poles, a second set of poles disposed substantially at right angles to said first mentioned pair of poles, said second mentioned pair of poles being substantially wider axially than said first pair of field poles, and windings on said second pair of poles whereby electrical energy may be obtained from a field, substantially at right angles to the field between said first mentioned pair of poles, set up by cutting lines of force of said first mentioned field.

11. In combination, a pair of poles, windings thereon, a source of alternating current for energizing said windings whereby an alternating magnetic field is set up between said poles, a rotor substantially wider than said poles having looped conductors thereon, said rotor during rotation setting up an alternating field substantially at right angles to the field set up between said poles, a second set of poles and a second set of windings thereon in the path of the magnetic field set up by the rotation of the rotor, said second mentioned windings having in series therewith a capacity of such value as to tune said second pair of windings when the mutual inductance between loops on the rotor, causing said second mentioned field, and said second mentioned windings is considered in connection with the inductance of said second mentioned windings.

NILS E. LINDENBLAD.